United States Patent
Himeda

(10) Patent No.: US 10,882,982 B2
(45) Date of Patent: Jan. 5, 2021

(54) RUBBER COMPOSITION FOR TREAD AND TIRE

(71) Applicant: SUMITOMO RUBBER INDUSTRIES, LTD., Hyogo (JP)

(72) Inventor: Shingo Himeda, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 0 days.

(21) Appl. No.: 16/289,757

(22) Filed: Mar. 1, 2019

(65) Prior Publication Data

US 2019/0270867 A1    Sep. 5, 2019

(30) Foreign Application Priority Data

Mar. 2, 2018 (JP) ................................. 2018-037760

(51) Int. Cl.
| | |
|---|---|
| *C08L 7/00* | (2006.01) |
| *C08L 9/06* | (2006.01) |
| *C08K 3/013* | (2018.01) |
| *B60C 1/00* | (2006.01) |
| *C08K 3/04* | (2006.01) |

(52) U.S. Cl.
CPC .............. *C08L 9/06* (2013.01); *B60C 1/0016* (2013.01); *C08K 3/013* (2018.01); *C08K 3/04* (2013.01); *C08L 7/00* (2013.01); *B60C 1/00* (2013.01); *C08K 2201/006* (2013.01)

(58) Field of Classification Search
CPC .... C08K 3/04; C08K 3/013; C08K 2201/006; B60C 1/0016; B60C 1/00; C08L 7/00; C08L 9/06
See application file for complete search history.

(56) References Cited

U.S. PATENT DOCUMENTS

| | | | | |
|---|---|---|---|---|
| 2013/0324668 | A1* | 12/2013 | Matsuo | ................ B60C 1/0016 525/232 |
| 2015/0299436 | A1 | 10/2015 | Shin et al. | |
| 2016/0083553 | A1* | 3/2016 | Kitago et al. | ............ C08K 5/05 523/155 |
| 2020/0139594 | A1* | 5/2020 | Cumings et al. | ...... C08G 77/16 |
| 2020/0148861 | A1* | 5/2020 | Miyazaki | ............. B60C 1/0016 |

FOREIGN PATENT DOCUMENTS

| | | |
|---|---|---|
| JP | 2000-219778 A | 8/2000 |
| JP | 2002-127714 A | 5/2002 |
| JP | 2014-024890 A | 2/2014 |
| JP | 2015-206029 A | 11/2015 |

* cited by examiner

*Primary Examiner* — Nathan M Nutter
(74) *Attorney, Agent, or Firm* — Greenblum & Bernstein, P.L.C.

(57) ABSTRACT

An object of the present invention is to provide a rubber composition for a tire having improved overall performances such as block crack resistance, abrasion resistance and heat build-up characteristic, and a tire having a tire member composed of this rubber composition. The rubber composition for a tire comprises a rubber component comprising 50% by mass or more of an isoprene rubber, 30% by mass or more of a butadiene rubber and 1 to 20% by mass of a styrene-butadiene rubber having a number-average molecular weight of 150,000 or more and a styrene content of 18 to 38% by mass, wherein a value obtained by multiplying a content (% by mass) of the styrene-butadiene rubber by a styrene content (% by mass) of the styrene-butadiene rubber is from 100 to 400.

5 Claims, No Drawings

RUBBER COMPOSITION FOR TREAD AND TIRE

TECHNICAL FIELD

The present invention relates to a rubber composition for a tire and a tire having a tire member composed of the rubber composition.

BACKGROUND OF THE INVENTION

Some tires, in particular, tires for heavy load application for trucks and buses and tires for running on an irregular ground, are provided with independent blocks surrounded by a tread pattern (grooves) on a tread. These blocks contribute to transferring of a driving force and a braking force, steering stability on snow and a muddy road surface, and improvement of drainage. However, chipping of blocks is apt to arise due to running on a rough road and aged deterioration, and if the chipping occurs, performance which the tire originally has is hardly exhibited.

JP 2014-024890 A describes a rubber composition for a tread, in which abrasion resistance and block crack resistance are improved by allowing the rubber composition to comprise crystallized carbon black. However, there is a room for improvement in compatibility between the both characteristics.

SUMMARY OF THE INVENTION

An object of the present invention is to provide a rubber composition for a tire having improved overall performances such as block crack resistance, abrasion resistance and heat build-up characteristic and a tire having a tire member composed of the rubber composition.

The present invention relates to a rubber composition for a tire comprising a rubber component comprising 50% by mass or more of an isoprene rubber, 30% by mass or more of a butadiene rubber and to 20% by mass of a styrene-butadiene rubber having a number-average molecular weight of 150,000 or more and a styrene content of 18 to 38% by mass, wherein a value obtained by multiplying a content (% by mass) of the styrene-butadiene rubber by a styrene content (% by mass) of the styrene-butadiene rubber is from 100 to 400.

The present invention further relates to a tire having a tire member composed of the above-mentioned rubber composition.

By using a tire member composed of the rubber composition according to the present invention, overall performances such as block crack resistance, abrasion resistance and heat build-up characteristic of a tire can be improved.

DETAILED DESCRIPTION

The rubber composition for a tire of one embodiment of the present invention is characterized by comprising a rubber component comprising 50% by mass or more of an isoprene rubber, 30% by mass or more of a butadiene rubber and 1 to 20% by mass of a styrene-butadiene rubber having a number-average molecular weight of 150,000 or more and a styrene content of 18 to 38% by mass, wherein a value obtained by multiplying a content (% by mass) of the styrene-butadiene rubber by a styrene content (% by mass) of the styrene-butadiene rubber is from 100 to 400. Herein, when a numerical range is shown using "to", it includes numerical values at both sides thereof.

In the rubber composition for a tire according to one embodiment of the present invention, it can be considered that by dispersing a styrene butadiene rubber (SBR) in an isoprene/butadiene polymer, an impact generated when running on a rough road is relaxed, and by setting a styrene content of the SBR and an amount of the SBR to be within predetermined ranges, heat generation can be made small and lowering of block stiffness due to running can be inhibited, thereby synergistically enhancing block crack resistance. Further, by using SBR having a large number-average molecular weight (Mn), lowering of abrasion resistance can be inhibited.

<Rubber Component>

Examples of a rubber component suitably used in one embodiment of the present invention include a styrene butadiene rubber (SBR), an isoprene rubber and a butadiene rubber (BR).

(SBR)

The SBR is not particularly limited. Examples of the SBR include a solution-polymerized SBR (S-SBR), an emulsion-polymerized SBR (E-SBR), a modified SBR thereof (modified S-SBR, modified E-SBR) and the like. Examples of the modified SBR include an end-modified and/or main-chain-modified SBR, a modified SBR coupled with a tin or silicon compound or the like (such as a condensate, one having a branch structure, etc.) and the like. Among these, S-SBR is preferable.

Examples of S-SBR usable in one embodiment of the present invention include S-SBRs manufactured by JSR Corporation, Sumitomo Chemical Company, Limited, Ube Industries, Ltd., Asahi Kasei Corporation, ZEON CORPORATION, etc.

A styrene content of the SBR is not less than 18% by mass, preferably not less than 20% by mass, more preferably not less than 22% by mass, for the reason that an effect of the present invention can be obtained sufficiently. Further, the styrene content is not more than 38% by mass, preferably not more than 35% by mass, more preferably not more than 33% by mass. When the styrene content exceeds 38% by mass, there is a tendency that heat generation is increased. It is noted that the styrene content of the SBR as used herein is calculated in accordance with $^1$H-NMR measurement.

A vinyl content of the SBR is preferably not less than 30 mole %, more preferably not less than 33 mole %, further preferably not less than 35 mole %. When the vinyl content is less than 30 mole %, wet grip performance tends to decrease. On the other hand, the vinyl content of the SBR is preferably not more than 60 mole %, more preferably not more than 55 mole %, further preferably not more than 50 mole %. When the vinyl content exceeds 60 mole %, there is a tendency that heat generation is increased. It is noted that the vinyl content of the SBR as used herein means an amount of 1,2-bond butadiene unit in the SBR, and is determined by an infrared absorption spectrum analysis method.

A number-average molecular weight (Mn) of the SBR is not less than 150,000, preferably not less than 180,000, more preferably not less than 200,000 from the viewpoint of abrasion resistance and grip performance. On the other hand, the Mn is preferably not more than 2,000,000, more preferably not more than 1,000,000 from the viewpoint of crosslinking uniformity. It is noted that the Mn can be calibrated with standard polystyrene based on measurement values determined with gel permeation chromatography (GPC) (GPC-8000 series manufactured by Tosoh Corporation; detector: differential refractometer; column: TSKGEL SUPERMALTPORE HZ-M manufactured by Tosoh Corporation).

An SBR content in the rubber component is not less than 1% by mass, preferably not less than 3% by mass, more preferably not less than 5% by mass. When the SBR content is less than 1% by mass, there is a tendency that an effect of the present invention becomes insufficient. On the other hand, the SBR content is not more than 20% by mass, preferably not more than 18% by mass, more preferably not more than 15% by mass. When the vinyl content exceeds 20% by mass, there is a tendency that heat generation is increased.

The value obtained by multiplying a content (% by mass) of the styrene-butadiene rubber by a styrene content (% by mass) of the styrene-butadiene rubber is preferably from 100 to 400, more preferably from 120 to 350, further preferably from 150 to 300. When the value exceeds 400, there is a tendency that heat generation is increased.

The value obtained by multiplying a content (% by mass) of the styrene-butadiene rubber by a vinyl content (mole %) of the styrene-butadiene rubber is preferably from 200 to 600, more preferably from 250 to 600, further preferably from 300 to 600. When the value exceeds 600, there is a tendency that heat generation is increased.

(Isoprene Rubber)

Examples of the usable isoprene rubber include those usually used in a tire industry, for example, an isoprene rubber (IR), a natural rubber and the like. Examples of the natural rubber include modified natural rubbers such as an epoxidized natural rubber (ENR), a hydrogenated natural rubber (HNR), a deproteinized natural rubber (DPNR), an ultra pure natural rubber (UPNR) and a grafted natural rubber besides an un-modified natural rubber (NR). These rubbers may be used alone, or may be used in combination of two or more thereof.

NR is not limited particularly, and those which are commonly used in a tire industry can be used. For example, there are SIR20, RSS #3, TSR20 and the like.

A content of the isoprene rubber in the rubber component is not less than 50% by mass, preferably not less than 55% by mass. When the content is less than 50% by mass, there is a tendency that an effect of the present invention becomes insufficient. On the other hand, the content of the isoprene rubber is preferably not more than 69% by mass, more preferably not more than 65% by mass. When the content exceeds 69% by mass, crack growth resistance tends to decrease.

(BR)

BR is not limited particularly, and examples of usable BRs include BRs usually used in a tire industry, for example, a BR having a content of cis-1,4 bond of less than 50% (low cis BR), a BR having a content of cis-1,4 bond of not less than 90% (high cis BR), a rare-earth butadiene rubber (rare-earth BR) synthesized using a rare-earth element catalyst, a BR comprising syndiotactic polybutadiene crystals (SPB-containing BR), a modified BR (high cis modified BR, low cis modified BR) and the like. Among these BRs, a high cis BR is preferable for the reason that abrasion resistance is good.

Examples of the high-cis BRs include BR1220 available from ZEON CORPORATION, BR130B, BR150B and BR150L available from Ube Industries, Ltd., R730 available from JSR Corporation and the like. When the rubber component comprises a high cis BR, low temperature characteristics and abrasion resistance can be enhanced. Examples of the rare-earth BRs include BUNA-CB25 manufactured by Lanxess K.K. and the like.

An example of the SPB-containing BR is not one in which 1,2-syndiotactic polybutadiene crystals are simply dispersed in the BR, but one in which 1,2-syndiotactic polybutadiene crystals are chemically bonded with the BR and dispersed therein. Examples of such SPB-containing BR include VCR-303, VCR-412 and VCR-617 manufactured by Ube Industries, Ltd. and the like.

Examples of a modified BR include a modified BR (tin modified BR) obtained by performing polymerization of 1,3-butadiene with a lithium initiator and then adding a tin compound, and further having the molecular terminals bonded with a tin-carbon bond, a butadiene rubber (modified BR for silica) having an alkoxysilane condensate compound in an active terminal thereof and the like. Examples of such modified BRs include BR1250H (tin-modified) manufactured by ZEON CORPORATION, S-modified polymer (modified for silica) manufactured by Sumitomo Chemical Industry Company Limited and the like.

A content of the BR in the rubber component is not less than 30% by mass, preferably not less than 35% by mass. When the content is less than 30% by mass, there is a tendency that an effect of the present invention becomes insufficient. On the other hand, the content of the BR is preferably not more than 49% by mass, more preferably not more than 45% by mass. When the content exceeds 49% by mass, block cracks tends to be easily generated.

The cis 1,4-bond content (cis content) in the BR is preferably 90% or more, more preferably 93% or more, still more preferably 95% or more, from the viewpoint of durability and abrasion resistance. It can be considered that since in the case of a larger cis content, a polymer chain is arranged regularly, an interaction between the polymers becomes strong, a polymer strength is enhanced and abrasion resistance is increased.

A weight-average molecular weight (Mw) of the BR is preferably not less than 400,000, more preferably not less than 450,000, further preferably not less than 500,000 from the viewpoint of abrasion resistance and grip performance. On the other hand, the weight-average molecular weight is preferably not more than 2,000,000, more preferably not more than 1,000,000 from the viewpoint of crosslinking uniformity. It is noted that the weight-average molecular weight of the BR can be calibrated with standard polystyrene based on measurement values determined with gel permeation chromatography (GPC) (GPC-8000 series manufactured by Tosoh Corporation; detector: differential refractometer; column: TSKGEL SUPERMALTPORE HZ-M manufactured by Tosoh Corporation).

(Other Rubber Components)

In one embodiment of the present invention, rubber components other than the isoprene rubber, SBR and BR can be used. Crosslinkable rubber components usually used in a rubber industry can be used as the other rubber components. Examples thereof include a styrene-isoprene-butadiene copolymer (SIBR), a styrene-isobutylene-styrene block copolymer (SIBS), a chloroprene rubber (CR), an acrylonitrile-butadiene rubber (NBR), a hydrogenated nitrile rubber (HNBR), a butyl rubber (IIR), an ethylene propylene rubber, a polynorbornene rubber, a silicone rubber, a polyethylene chloride rubber, a fluorine-containing rubber (FKM), an acrylic rubber (ACM), a hydrin rubber and the like. These other rubber components may be used alone, or may be used in combination of two or more thereof.

<Carbon Black>

It is preferable that the rubber composition for a tire according to one embodiment of the present invention comprises a predetermined amount of small particle size carbon black having a cetyltrimethylammonium bromide (CTAB) adsorbing-specific surface area of 130 $m^2/g$ or more. By dispersing small particle size carbon black in the neighborhood of a boundary of each phase of the isoprene rubber, the BR and the SBR to increase contact of the SBR with carbon black, bonding between the respective phases is made strong, thereby making it possible to obtain a rubber composition being capable of effectively absorbing an impact generated when running on a rough road. Further, it can be considered that by use of small particle size carbon black, a reinforcing effect on the rubber composition is enhanced and block crack resistance and abrasion resistance are enhanced.

The cetyltrimethylammonium bromide (CTAB) adsorbing-specific surface area of the small particle size carbon black is preferably 130 $m^2/g$ or more, more preferably 135 $m^2/g$ or more, further preferably 140 $m^2/g$ or more from the viewpoint of block crack resistance. On the other hand, an upper limit of the CTAB adsorbing-specific surface area of the small particle size carbon black is not limited particularly, and is preferably 165 $m^2/g$ or less, more preferably 162 $m^2/g$ or less, further preferably 160 $m^2/g$ or less from the viewpoint of satisfactory low temperature characteristics. The CTAB adsorbing-specific surface area of the carbon black can be measured in accordance with JIS K 6217-3: 2001.

An iodine adsorption amount of the small particle size carbon black is preferably 130 mg/g or more, more preferably 135 mg/g or more, further preferably 140 mg/g or more. When the iodine adsorption amount is less than 130 mg/g, there is a tendency that block crack resistance becomes insufficient. An upper limit of the iodine adsorption amount is not limited particularly, and is preferably 180 mg/g or less, more preferably 160 mg/g or less, further preferably 150 mg/g or less from the viewpoint of processability. It is noted that herein the iodine adsorption amount of carbon black is a value measured in accordance with JIS K 6217-1.

The content of the small particle size carbon black is preferably not less than 20 parts by mass, more preferably not less than 22 parts by mass, further preferably not less than 25 parts by mass based on 100 parts by mass of the rubber component. When the content is less than 20 parts by mass, there is a tendency that block crack resistance becomes insufficient. On the other hand, the content of the small particle size carbon black is preferably not more than 40 parts by mass, more preferably not more than 35 parts by mass, further preferably not more than 30 parts by mass. When the content exceeds 40 parts by mass, there is a tendency that heat generation is liable to arise.

Further, carbon black having an iodine adsorption amount of less than 130 mg/g, preferably carbon black having an iodine adsorption amount of from 110 to 130 mg/g may be used as the carbon black in addition to the small particle size carbon black. When carbon black having an iodine adsorption amount of less than 130 mg/g is used, a balance between block crack resistance and heat build-up characteristic can be kept. When the rubber composition comprises carbon black having an iodine adsorption amount of less than 130 mg/g, its content based on 100 parts by mass of the rubber component is not limited particularly, and is preferably not more than 40 parts by mass, more preferably not more than 35 parts by mass from the viewpoint of reinforcing property.

The above-mentioned small particle size carbon black may be used alone as the carbon black or may be used in combination with other kind of carbon black. It is preferable that the above-mentioned small particle size carbon black is contained in an amount of not less than 30% by mass, preferably not less than 40% by mass, more preferably not less than 50% by mass in the whole carbon black. When the amount is less than 30% by mass, there is a problem that performance of the small particle size carbon black used in this embodiment cannot be exhibited sufficiently. Further, the above-mentioned carbon black other than the small particle size carbon black can be contained in an amount of from 0 to 70% by mass, preferably from 10 to 60% by mass, more preferably from 20 to 50% by mass in the whole carbon black.

Carbon black commonly used for rubber can be used appropriately as the other kind of carbon black. Specifically N110, N115, N120, N125, N134, N135, N219, N220, N231, N234, N293, N299, N326, N330, N339, N343, N347, N351, N356, N358, N375, N539, N550, N582, N630, N642, N650, N660, N683, N754, N762, N765, N772, N774, N787, N907, N908, N990, N991 and the like can be used suitably. Besides those mentioned above, carbon black synthesized by Sumitomo Rubber Industries, Ltd. can also be used suitably.

<Other Components>

In addition to the above-mentioned components, other compounding components commonly used in the manufacturing of the rubber composition, for example, fillers other than the above-mentioned carbon black (other fillers), zinc oxide, stearic acid, antioxidants, processing aids, waxes, softening agents, vulcanizing agents, vulcanization accelerators and the like can be optionally compounded in the rubber composition for a tread in one embodiment of the present invention.

The above-mentioned other fillers are not limited particularly, and examples thereof include silica, aluminum hydroxide, alumina (aluminum oxide), calcium carbonate, talc and the like. These fillers can be used alone or can be used in combination with two or more kinds thereof.

Silica is not limited particularly, and examples thereof include silica prepared by a dry method (anhydrous silica), silica prepared by a wet method (hydrous silica) and the like. Hydrous silica prepared by a wet method is preferred for the reason that many silanol groups are contained.

A BET specific surface area of silica is preferably 80 $m^2/g$ or more, more preferably 100 $m^2/g$ or more from the viewpoint of durability and elongation at break. The BET specific surface area of silica is preferably 250 $m^2/g$ or less, more preferably 220 $m^2/g$ or less from the viewpoint of fuel efficiency and processability. It is noted that herein the BET specific surface area of silica is a value measured in accordance with ASTM D3037-93.

When the rubber composition comprises silica, the content thereof is preferably not less than 1 part by mass, more preferably not less than 3 parts by mass based on 100 parts by mass of the rubber component from the viewpoint of durability and elongation at break. Further, from the viewpoint of abrasion resistance, the content of silica is preferably not more than 20 parts by mass, more preferably not more than 15 parts by mass, further preferably not more than 10 parts by mass based on 100 parts by mass of the rubber component.

Silica is preferably used in combination with a silane coupling agent. The silane coupling agent may be any silane coupling agents conventionally used in conjunction with silica in the rubber industry. Examples of the silane coupling agent include sulfide-based silane coupling agents such as bis(3-triethoxysilylpropyl) disulfide and bis(3-triethoxysilylpropyl) tetrasulfide; mercapto-based silane coupling agents such as 3-mercaptopropyltrimethoxysilane and NXT-Z100, NXT-Z45, NXT and the like manufactured and sold by Momentive Performance Materials (silane coupling agents having a mercapto group); vinyl-based silane coupling agents such as vinyltriethoxysilane; amino-based silane coupling agents such as 3-aminopropyltriethoxysilane; glycidoxy-based silane coupling agents such as γ-glycidoxypropyltriethoxysilane; nitro-based silane coupling agents such as 3-nitropropyltrimethoxysilane; and chloro-based silane coupling agents such as 3-chloropropyltrimethoxysilane. These silane coupling agents may be used alone or may be used in combination of two or more thereof.

When the rubber composition comprises a silane coupling agent, the content thereof is preferably 1 part by mass or more, more preferably 3 parts by mass or more based on 100 parts by mass of silica for the reason that sufficient effects of improving dispersibility of fillers and decreasing a viscosity can be obtained. The content of the silane coupling agent is preferably 12 parts by mass or less, more preferably 10 parts by mass or less based on 100 parts by mass of silica. When the content of the silane coupling agent exceeds 12 parts by mass, sufficient coupling effect and silica dispersing effect cannot be obtained and the reinforcing property deteriorates.

The antioxidant is not particularly limited, and any antioxidants conventionally used in a field of rubbers can be used. Examples of the antioxidant include quinoline-based antioxidants, quinone-based antioxidants, phenol-based antioxidants, phenylenediamine-based antioxidants and the like.

When the rubber composition comprises the antioxidant, the content thereof is preferably 0.5 part by mass or more, more preferably 0.8 part by mass or more based on 100 parts by mass of the rubber component. In addition, the content of the antioxidant is preferably 2.0 parts by mass or less, more preferably 1.5 parts by mass or less, further preferably 1.2 parts by mass or less based on 100 parts by mass of the rubber component from the viewpoint of dispersibility of the filler and the like, elongation at break and kneading efficiency.

Examples of the processing aid include fatty acid metal salts such as zinc stearate and the like. Specifically there are, for example, fatty acid soap processing aids such as Struktol EF44 and WB16 available from Schill & Seilacher Struktol GmbH. A compounding amount of the processing aid is preferably not less than 0.1 part by mass based on 100 parts by mass of a total amount of rubber components, and is preferably not more than 5 parts by mass, particularly preferably not more than 3 parts by mass.

When the rubber composition comprises the wax, the content thereof is preferably not less than 0.5 part by mass, more preferably not less than 1 part by mass based on 100 parts by mass of the rubber component from the viewpoint of securing weather resistance of a rubber. On the other hand, the content thereof is preferably not more than 10 parts by mass, more preferably not more than 5 parts by mass, from the viewpoint of preventing whitening of a tire due to blooming of the wax on the surface of a tire.

When the rubber composition comprises the stearic acid, the content thereof is preferably not less than 0.2 part by mass, more preferably not less than 1 part by mass based on 100 parts by mass of the rubber component from the viewpoint of obtaining a vulcanization rate. On the other hand, the content thereof is preferably not more than 10 parts by mass, more preferably not more than 5 parts by mass, from the viewpoint of processability.

When the rubber composition comprises the zinc oxide, the content thereof is preferably not less than 0.5 part by mass, more preferably not less than 1 part by mass based on 100 parts by mass of the rubber component from the viewpoint of obtaining a vulcanization rate. On the other hand, the content thereof is preferably not more than 10 parts by mass, more preferably not more than 5 parts by mass, from the viewpoint of brasion resistance.

The softening agent means a component soluble in acetone, and examples thereof include oil such as process oil and vegetable fats and oils, liquid diene polymers and the like. These softening agents may be used alone or may be used in combination of two or more thereof. Among these, oil is preferred.

Examples of oil include a process oil, vegetable fats and oils, or a mixture thereof. Examples of process oil include a paraffin process oil, a naphthenic process oil, an aromatic process oil (aromatic oil) and the like. Examples of vegetable oils and fats include castor oil, cotton seed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, tsubaki oil, jojoba oil, macadamia nut oil, tung oil, and the like. Among these, aromatic oil is preferred.

The liquid diene polymer is not limited particularly as long as it is a liquid diene polymer having a weight-average molecular weight of not more than 50,000. Examples thereof include a styrene-butadiene copolymer (rubber), a butadiene polymer (rubber), an isoprene polymer (rubber), an acrylonitrile-butadiene copolymer (rubber) and the like. Among the liquid diene polymers, liquid styrene-butadiene copolymer (liquid styrene-butadiene rubber (liquid SBR)) is preferable for the reason that on-ice performance is good. Further the liquid butadiene polymer (liquid butadiene rubber (liquid BR)) is preferable for the reason that an effect of enhancing abrasion resistance is remarkable.

A weight-average molecular weight (Mw) of the liquid diene polymer is preferably not less than 1,000, more preferably not less than 1,500 for the reason that an effect of enhancing abrasion resistance is satisfactory. On the other hand, the weight-average molecular weight is preferably not more than 50,000, more preferably not more than 20,000, more preferably not more than 15,000 from the viewpoint of on-ice performance. It is noted that herein the weight-average molecular weight (Mw) can be calibrated with standard polystyrene based on measurement values determined with gel permeation chromatography (GPC) (GPC-8000 series manufactured by Tosoh Corporation; detector: differential refractometer; column: TSKGEL SUPERMALTPORE HZ-M manufactured by Tosoh Corporation).

A content of the softening agent is preferably not less than 1 part by mass, more preferably not less than 3 parts by mass based on 100 parts by mass of the rubber component from the viewpoint of processability. On the other hand, the content of the softening agent is preferably not more than 10 parts by mass, more preferably not more than 5 parts by mass from the viewpoint of block crack resistance and abrasion resistance.

Sulfur is suitably used as the vulcanizing agent. Examples of usable sulfur include powdered sulfur, oil-treated sulfur, precipitated sulfur, colloidal sulfur, insoluble sulfur, highly dispersible sulfur and the like.

When sulfur is contained as the vulcanizing agent, the content thereof is preferably 0.5 part by mass or more, more preferably 1.0 part by mass or more based on 100 parts by mass of the rubber component from the viewpoint of securing sufficient vulcanization reaction and obtaining a good grip performance and abrasion resistance. The content of the vulcanizing agent is preferably 3.0 parts by mass or less, more preferably 2.5 parts by mass or less based on 100 parts by mass of the rubber component from the viewpoint of degradation.

Examples of vulcanizing agents other than sulfur include a vulcanizing agent containing a sulfur atom such as TACKIROL V200 manufactured by Taoka Chemical Co., Ltd., DURALINK HTS (1,6-hexamethylene-sodium dithiosulfate dehydrate) manufactured by Flexsys, KA9188 (1,6-bis(N,N'-dibenzylthiocarbamoyldithio) hexane) manufactured by LANXESS K.K. and the like, an organic peroxide such as a dicumyl peroxide and the like.

Examples of a vulcanization accelerator include sulfenamide-, thiazole-, thiuram-, thiourea-, guanidine-, dithiocarbamate-, aldehyde amine- or aldehyde ammonia-, imidazoline- and xanthate-based vulcanization accelerators. These vulcanization accelerators may be used alone or may be used in combination of two or more thereof. Among these, sulfenamide-based vulcanization accelerators, thiazole-based vulcanization accelerators and guanidine-based vulcanization accelerators are preferred, and sulfenamide-based vulcanization accelerators are preferred more.

Examples of sulfenamide-based vulcanization accelerators include N-t-butyl-2-benzothiazolylsulfenamide (TBBS), N-cyclohexyl-2-benzothiazolylsulfenamide (CBS), N,N'-dicyclohexyl-2-benzothiazolylsulfenamide (DCBS) and the like. Among these, N-t-butyl-2-benzothiazolylsulfenamide (TBBS) and N-cyclohexyl-2-benzothiazolylsulfenamide (CBS) are preferred.

Examples of the thiazole-based vulcanization accelerator include 2-mercaptobenzothiazole, cyclohexylamine salt of 2-mercaptobenzothiazole, di-2-benzothiazolyl disulfide and the like. Among these, 2-mercaptobenzothiazole is preferable.

Examples of the guanidine-based vulcanization accelerator include 1,3-diphenylguanidine, 1,3-di-o-tolylguanidine, 1-o-tolylbiguanide, di-o-tolylguanidine salt of dicatechol borate, 1,3-di-o-cumenylguanidine, 1,3-di-o-biphenylguanidine, 1,3-di-o-cumenyl-2-propionylguanidine and the like. Among these, 1,3-diphenylguanidine is preferable.

When the rubber composition comprises the vulcanization accelerator, a content thereof is preferably not less than 0.5 part by mass, more preferably not less than 1.0 part by mass based on 100 parts by mass of the rubber component from the viewpoint of securing sufficient vulcanization rate. On the other hand, the content of the vulcanization accelerator is preferably not more than 10 parts by mass, more preferably not more than 5 parts by mass from the viewpoint of inhibiting blooming.

<Preparation of Rubber Composition and Tire>

The rubber composition according to one embodiment of the present invention can be prepared by a usual method. The rubber composition can be prepared, for example, by a method of kneading the above-mentioned components other than the vulcanizing agent and the vulcanization accelerator with a generally well-known kneading machine used in a rubber industry such as a Banbury mixer, a kneader or an open roll and then adding the vulcanizing agent and the vulcanization accelerator, followed by further kneading and then conducting vulcanization, or by other method.

Another embodiment of the present invention provides a tire having a tire member composed of the above-mentioned rubber composition. Examples of the tire member composed of the above-mentioned rubber composition include tire members such as a tread, an under tread, a carcass, a side wall and a bead of a tire. Among these, a tread is preferable since it has good wet grip performance, abrasion resistance and fuel efficiency.

A tire according to this embodiment of the present invention can be produced by a usual method using the above-mentioned rubber composition. Namely, the tire can be produced by subjecting an unvulcanized rubber composition obtained by kneading the above-mentioned components, to extrusion processing to a shape of a tire member such as a tread, and then laminating together with other tire members on a tire building machine and forming by a usual forming method, thus forming an unvulcanized tire, and heating and compressing this unvulcanized tire in a vulcanizer.

A category of the tire according to this embodiment of the present invention is not limited particularly, and tires for a passenger car, heavy load tires for trucks, buses and the like, tires for two-wheel vehicles, run flat tires, pneumatic tires, etc. are preferable, and the tire according to this embodiment of the present invention is particularly suitably used as tires for trucks. Further, the tire according to this embodiment of the present invention is good in abrasion resistance and chipping resistance, and therefore, is suitable for running on a rough road surface (unpaved rough road surface).

The present invention will be described based on Examples, but the present invention is not limited thereto only.

A variety of chemicals used in Examples and Comparative Examples will be explained below.

NR: TSR20

SBR1: Non-oil extended solution-polymerized SBR (Mn: 300,000, styrene content: 27% by mass, vinyl content: 57 mole %)

SBR2: Non-oil extended solution-polymerized SBR (Mn: 180,000, styrene content: 20% by mass, vinyl content: 60 mole %)

SBR3: Non-oil extended solution-polymerized SBR (Mn: 430,000, styrene content: 10% by mass, vinyl content: 40 mole %)

SBR4: Non-oil extended solution-polymerized SBR (Mn: 100,000, styrene content: 24% by mass, vinyl content: 16 mole %)

BR: UBEPOL BR150B (high-cis BR, cis-1,4 bond content: 96%) manufactured by Ube Industries, Ltd.

Carbon black 1: CTAB adsorbing-specific surface area: 138 $m^2/g$, iodine adsorption amount: 145 mg/g Carbon black 2: SHOBLACK N220 manufactured by Cabot Japan K. K. (CTAB adsorbing-specific surface area: 110 $m^2/g$, iodine adsorption amount: 121 mg/g)

Wax: Ozoace 355 manufactured by NIPPON SEIRO CO., LTD.

Antioxidant: NOCRAC 6C (N-(1,3-dimethylbutyl)-N'-phenyl-p-phenylenediamine) manufactured by OUCHI SHINKO CHEMICAL INDUSTRIAL CO., LTD.

Stearic acid: Stearic acid beads "Tsubaki" manufactured by NOF Corporation

Zinc oxide: Zinc Oxide No. 2 manufactured by Mitsui Mining & Smelting Co., Ltd.

Oil: TDAE oil manufactured by JX Nippon Oil & Energy Corporation Sulfur: Powdered sulfur manufactured by Tsurumi Chemical Industry Co., Ltd.

Vulcanization accelerator: Nocceler NS (N-tert-butyl-2-benzothiazolylsulfeneamide (TBBS)) manufactured by OUCHI SHINKO CHEMICAL INDUSTRIAL CO., LTD.

Examples and Comparative Examples

According to the compounding formulations shown in Table 1, all chemicals, other than sulfur and a vulcanization accelerator, were kneaded using a 1.7 L sealed Banbury mixer for five minutes up to a discharge temperature of 170° C. to obtain a kneaded product. Then, the obtained kneaded product was kneaded again (remilled) at a discharge temperature of 150° C. for four minutes by the Banbury mixer. Then, sulfur and a vulcanization accelerator were added to the obtained kneaded product, and kneaded for 4 minutes up to 105° C. using a biaxial open roll to obtain an unvulcanized rubber composition. The obtained unvulcanized rubber composition was press-vulcanized at 170° C. for 12 minutes to manufacture a test rubber composition.

Further, the obtained unvulcanized rubber composition was extruded and molded into the shape of a tire tread by an extruder equipped with a base having a predetermined shape, and then laminated with other tire members to form an unvulcanized tire, which was then press-vulcanized to manufacture a test tire (12R22.5, a tire for a truck and a bus).

The obtained unvulcanized rubber compositions, vulcanized rubber compositions and test tires were subjected to the following evaluation. The evaluation results are shown in Table 1.

(Block Crack Resistance)

The respective test tires were mounted on all wheels of a vehicle (truck), and after running a distance of 8,000 km, a block crack condition was visually observed and evaluated by a score. The result is indicated by an index obtained by the following equation, assuming that the score of Example 3 is 100. It shows that the larger the index is, the less the block cracking is and the higher the block crack resistance is.

(Block crack resistance index)=(Score of each formulation)/(Score of Example 3×100

(Abrasion Resistance)

The respective test tires were mounted on all wheels of a vehicle (truck), and after running a distance of 8,000 km, a groove depth of a tire tread portion was measured. Then, a running distance when the tire groove depth was reduced by 1 mm was measured. The result of each of the test tires is indicated by an index obtained by the following equation, assuming that a running distance when a tire groove of Example 3 was reduced by 1 mm is 100. It shows that the larger the index is, the better the abrasion resistance is.

(Abrasion resistance index)=(Running distance when the tire groove depth of each formulation was reduced by 1 mm)/(Running distance when the tire groove depth of Example 3 was reduced by 1 mm)×100

(Heat Build-Up Characteristic)

A loss tangent (tan δ) at 70° C. of each of the vulcanized rubber compositions was measured using a viscoelasticity spectrometer VES manufactured by IWAMOTO Quartz GlassLabo Co., Ltd. under the conditions of an initial strain of 10%, a dynamic strain of 2% and a frequency of 10 Hz. The result is indicated by an index obtained by the following equation, assuming that the tan δ of Example 3 is 100. It shows that the larger the index is, the better the fuel efficiency is.

(Heat build-up characteristic index)=(Tan δ of Example 3/(Tan δ of each formulation)×100

TABLE 1

|  | Example | | | | Comparative Example | |
|---|---|---|---|---|---|---|
|  | 1 | 2 | 3 | 4 | 1 | 2 |
| Compounding amount (part by mass) | | | | | | |
| NR | 50 | 50 | 50 | 50 | 50 | 50 |
| SBR 1 | 10 | — | — | 10 | — | — |
| SBR 2 | — | 10 | 20 | — | — | — |
| SBR 3 | — | — | — | — | 10 | — |
| SBR 4 | — | — | — | — | — | 20 |
| BR | 40 | 40 | 30 | 40 | 40 | 30 |
| Carbon black 1 | 25 | 25 | 25 | 40 | 25 | 25 |
| Carbon black 2 | 25 | 25 | 25 | 10 | 25 | 25 |
| Wax | 1.0 | 1.0 | 1.0 | 1.0 | 1.0 | 1.0 |
| Antioxidant | 2.0 | 2.0 | 2.0 | 2.0 | 2.0 | 2.0 |
| Stearic acid | 2.0 | 2.0 | 2.0 | 2.0 | 2.0 | 2.0 |
| Zinc oxide | 4.0 | 4.0 | 4.0 | 4.0 | 4.0 | 4.0 |
| Oil | 3.0 | 3.0 | 3.0 | 3.0 | 3.0 | 3.0 |
| Sulfur | 1.5 | 1.5 | 1.5 | 1.5 | 1.5 | 1.5 |
| Vulcanization accelerator | 1.5 | 1.5 | 1.5 | 1.5 | 1.5 | 1.5 |
| Evaluation | | | | | | |
| Block crack resistance | 88 | 87 | 100 | 95 | 77 | 88 |
| Abrasion resistance | 110 | 108 | 100 | 118 | 106 | 99 |
| Heat build-up characteristic | 116 | 121 | 100 | 108 | 101 | 97 |

From the results shown in Table 1, it is seen that the tire having a tire member composed of the rubber composition for a tire of the present invention comprising an isoprene rubber, a butadiene rubber and a predetermined styrene butadiene rubber has improved overall performances such as block crack resistance, abrasion resistance and heat build-up characteristic.

According to the present invention, a rubber composition for a tire having improved overall performances such as block crack resistance, abrasion resistance and heat build-up characteristic and a tire having a tire member composed of the rubber composition can be provided.

What is claimed is:

1. A rubber composition for a tire comprising a rubber component comprising 50 to 69% by mass of an isoprene rubber, 30 to 49% by mass of a butadiene rubber, and 1 to 20% by mass of a styrene-butadiene rubber having a number-average molecular weight of 300,000 or more and a styrene content of 18 to 38% by mass, wherein a value obtained by multiplying a content (% by mass) of the styrene-butadiene rubber by a styrene content (% by mass) of the styrene-butadiene rubber is from 100 to 400.

2. The rubber composition for a tire of claim 1, wherein the vinyl content of the styrene-butadiene rubber is from 30 to 60 mole % and the value obtained by multiplying a content (% by mass) of the styrene-butadiene rubber by a vinyl content (mole %) of the styrene-butadiene rubber is from 200 to 600.

3. The rubber composition for a tire of claim 1, comprising 20 parts by mass or more of carbon black having a cetyltrimethylammonium bromide (CTAB) adsorption specific surface area of 130 m$^2$/g or more based on 100 parts by mass of the rubber component.

4. The rubber composition for a tire of claim 1, comprising 30% by mass or more of carbon black having an iodine adsorption amount of 130 mg/g or more based on a whole carbon black.

5. A tire having a tire member composed of the rubber composition for a tire of claim 1.

\* \* \* \* \*